G. H. MULKEY.
Saw-Cleaning Attachment for Cotton-Gins.

No. 215,654. Patented May 20, 1879.

Attest
Walter Knight
Harry Knight

Inventor
Geo. H. Mulkey
By Knight Bros
Attys.

UNITED STATES PATENT OFFICE.

GEORGE H. MULKEY, OF FORT WORTH, TEXAS, ASSIGNOR OF ONE-HALF HIS RIGHT TO DAVID JONES, OF SAME PLACE.

IMPROVEMENT IN SAW-CLEANING ATTACHMENTS FOR COTTON-GINS.

Specification forming part of Letters Patent No. 215,654, dated May 20, 1879; application filed March 29, 1879.

*To all whom it may concern:*

Be it known that I, GEORGE H. MULKEY, of Fort Worth, Tarrant county, Texas, have invented a new and useful Saw-Cleaning Attachment for Cotton-Gins, of which the following is a specification.

This invention relates to a device or apparatus the purpose and effect of which are to remove the lint, "gum," and other foreign matters, which, by clinging to and choking the serrations of the gin-saws, operate to greatly impede their action and diminish their usefulness, especially in humid and certain peculiar electrical conditions of the atmosphere.

I provide for this purpose a gang of disks, of india-rubber or other suitable material, mounted upon a shaft which is journaled parallel to the gang of gin-saws, so that one disk projects between each pair of saws, and there is one on each side of each of the consecutive saws, overlapping it to a distance fully equal to the depth of the serrations.

A lever or other suitable device enables the attendant to bring a friction-pulley mounted upon the cleaner-shaft in contact with the band-pulley of the gin-shaft, so as to rotate the former by the latter number; and by the same or other lever I enable him to reciprocate the gang of cleaners, so as to bring them alternately against the right and the left sides of the gin-saws.

The proportions and relations of the said pulleys are such as to cause the cleaning-disks to rotate at a considerably higher peripheral velocity than the saws, and in such direction as to wipe or sweep the saw-teeth from base to point.

Figure 1:
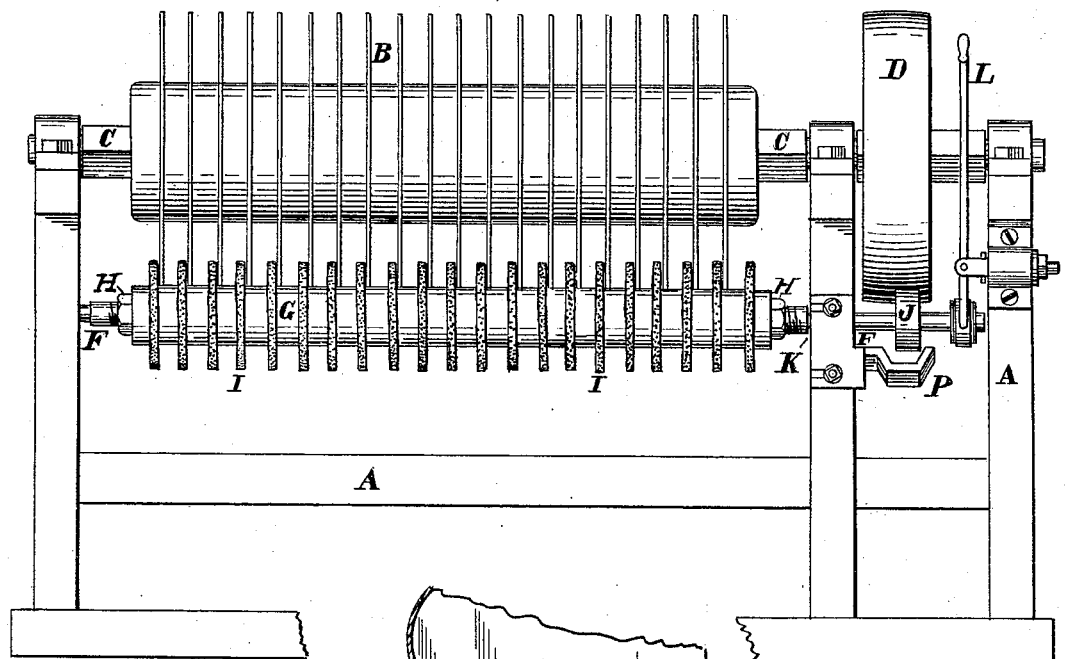
Figure 2:
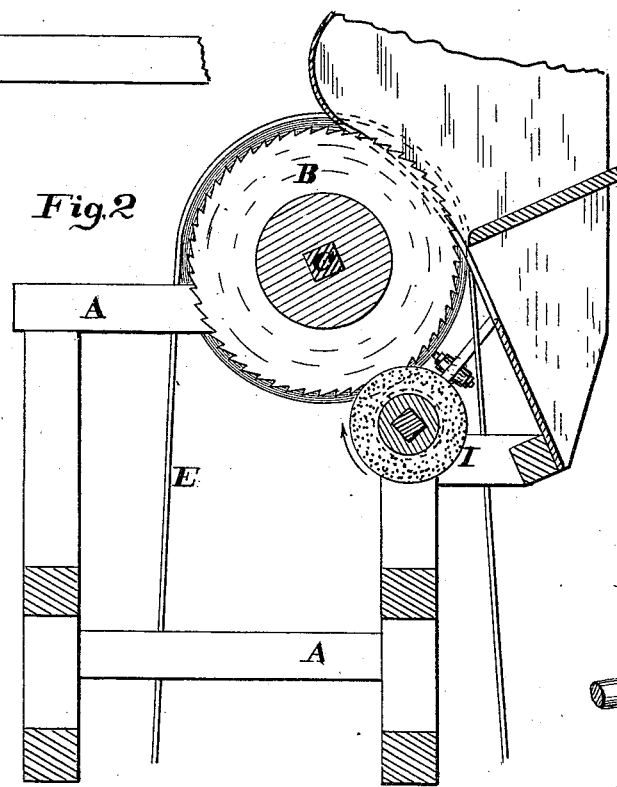
Figure 4:
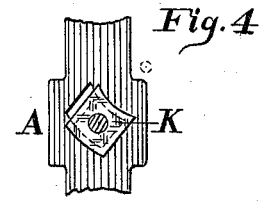
Figure 3:
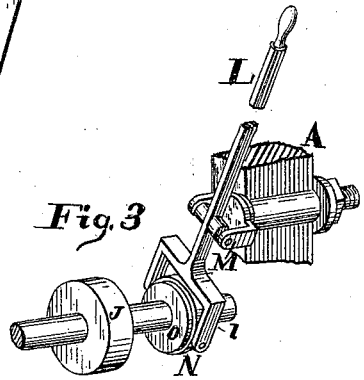

In the accompanying drawings, Figure 1 is a front elevation of a cotton-gin provided with my cleaning attachment. Fig. 2 is a transverse section of the same. Fig. 3 is a perspective view, to a larger scale, of my cleaner-shifting mechanism. Fig. 4 is an end view of the shiftable bearing of the cleaner-shaft.

A A represent portions of the frame of a cotton-gin; B, the gin-saws; C, the gin-shaft; D, the gin-driving pulley; E, its belt. F is a shaft journaled parallel to and beneath the gang of gin-saws. Securely attached to shaft F by means of washers G and keys or nuts H, or other suitable devices, is a series of precisely similar and equidistant disks, I, of india-rubber or other suitable material. The thickness of these disks is somewhat less than the space between consecutive saws. The shaft F has also permanently attached to it a friction-pulley, J, of so much less diameter than pulley D as, when brought in contact with the latter, to rotate the cleaner-disks at a much higher peripheral velocity than that of the gin-saws, and in the direction from heel to point of their teeth.

In order that the disks may remain inactive, save when brought purposely into action by the person in charge, the journal K of the shaft F, which is nearest to the friction-pulley, is made capable of a slight lateral shift or motion in the frame, as indicated in Fig. 4, so that when permitted to rest, as in said figure, the friction-pulley is out of contact with the gin-pulley, and no rotation of the cleaners takes place.

To enable the gang of cleaners to be brought alternately against the right and left sides of the saws, the shaft F is made capable of a slight longitudinal shift in its bearings.

The shift of the cleaner into and out of effective action, and their shift into or out of contact with the saws, and that either on their right or on their left sides, may be effected by distinct and separate mechanisms; but I prefer to effect these several motions by means of a single lever, L, supported upon a universal or gimbal joint, M, so as to be capable of vibration either longitudinally or transversely of the frame, or both simultaneously. The lower end of the lever L is forked, to embrace a yoke or sleeve, N, upon a grooved collar, O, of the cleaner-shaft F.

A rack, P, secured to the frame may enable the pulley J, when the cleaning device is out of service, to retain the middle position of its longitudinal motion, so as to prevent any needless or injurious contact of the cleaner with the saws. This rack may be made adjustable horizontally, as shown in the drawings.

The above-described details of construction may be modified or varied—as, for example, simple keys and collars may be used in place of the nuts H. (Shown in Fig. 1.) A spring having the effect of automatically bringing the cleaner-shaft to its intermediate position may be employed, either instead of or in addition to such rack. A spring-latch upon the lever L may engage automatically in the rack.

An inferior modification of my invention may, in place of the revolving cleaners, consist of a series of gum-elastic or other suitable lugs projecting from a simple bar, capable of lateral and longitudinal motions; but in this form the gin-saws must, during the process of cleaning, be driven in reverse rotation to that which they make in the operation of ginning.

I claim as new and of my invention—

1. The shaft F, having a series of disks, I, of india-rubber or other suitable material, of less thickness than the intervals between the successive gin-saws, and held at the same consecutive distances by means of washers G, substantially as set forth.

2. In a cotton-gin cleaner, the shaft F, armed with the series of disks I, driven by means of friction-pulley J, and having the lever L, whereby said pulley is brought into contact with and operated by the driving-pulley D, substantially as set forth.

3. In a cotton-gin cleaner, the shaft F, armed with cleaning-disks I, and capable of horizontal and vertical adjustment, substantially as and for the purpose set forth.

4. The series of disks I, of rubber or other suitable material, overlapping and driven at a higher peripheral velocity than the gin-saws, and capable, by means of lever L or its equivalent, of being pressed alternately against the right and left sides of the gin-saws, substantially as and for the purpose set forth.

In testimony of which invention I hereunto set my hand.

GEORGE H. MULKEY.

Attest:
J. F. ELLIS,
J. L. STEPHENSON.